US011748236B2

(12) United States Patent
Liu et al.

(10) Patent No.: US 11,748,236 B2
(45) Date of Patent: Sep. 5, 2023

(54) MULTI-USER DEBUGGING WITH USER DATA ISOLATION

(71) Applicant: International Business Machines Corporation, Armonk, NY (US)

(72) Inventors: Zhen Liu, Beijing (CN); Jia Tian Zhong, Beijing (CN); Le Chang, Beijing (CN); Ming Lei Zhang, Beijing (CN); Ting Ting Zhan, Beijing (CN); Xiao Yan Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 17/467,906

(22) Filed: Sep. 7, 2021

(65) Prior Publication Data
US 2023/0071020 A1    Mar. 9, 2023

(51) Int. Cl.
*G06F 9/44*    (2018.01)
*G06F 9/445*   (2018.01)
(Continued)

(52) U.S. Cl.
CPC .......... *G06F 11/3664* (2013.01); *G06F 8/77* (2013.01); *G06F 21/6218* (2013.01)

(58) Field of Classification Search
CPC ..... G06F 11/3664; G06F 8/77; G06F 21/6218
See application file for complete search history.

(56) References Cited

U.S. PATENT DOCUMENTS

2014/0053125 A1* 2/2014 DeLuca ............ G06F 8/71
 717/101
2015/0058823 A1 2/2015 Cai et al.
(Continued)

FOREIGN PATENT DOCUMENTS

CN   111078554 A  *  4/2020 .......... G06F 11/3644
CN   112231231 A  *  1/2021

OTHER PUBLICATIONS

Arian Treffer, Back-in-Time Debugging in Heterogeneous Software Stacks, 2017, pp. 1-8. https://ieeexplore.ieee.org/stamp/stamp.jsp?tp=&arnumber=8109282 (Year: 2017).*
(Continued)

*Primary Examiner* — Mongbao Nguyen
(74) *Attorney, Agent, or Firm* — Cantor Colburn LLP; Teddi Maranzano

(57) ABSTRACT

Examples described herein provide a computer-implemented method for multi-user debugging of a program. The method includes receiving a first request from a first developer to initiate a debug of the program and receiving a second request from a second developer to initiate the debug of the program. The method further includes, responsive to receiving the first request and the second request, initiating the debug of the program. The method further includes sending first source code for the program to the first developer, wherein the first source code is associated with the first developer. The method further includes sending second source code for the program to the second developer, wherein the second source code is associated with the second developer. The method further includes updating the program responsive to receiving a change to at least one of the first source code or the second source code.

15 Claims, 9 Drawing Sheets

(51) Int. Cl.
  *G06F 9/455*   (2018.01)
  *G06F 11/36*  (2006.01)
  *G06F 8/77*    (2018.01)
  *G06F 21/62*  (2013.01)

(56) References Cited

U.S. PATENT DOCUMENTS

| | | |
|---|---|---|
| 2017/0147471 A1 | 5/2017 | Shadi et al. |
| 2018/0129584 A1 | 5/2018 | Somasundaram et al. |
| 2019/0213355 A1* | 7/2019 | Raviv .................... H04L 51/04 |
| 2019/0227904 A1 | 7/2019 | Raviv et al. |
| 2020/0204618 A1* | 6/2020 | Agarwal ............. H04L 63/1458 |
| 2021/0149788 A1* | 5/2021 | Downie ............. G06F 11/3604 |
| 2021/0311854 A1* | 10/2021 | Odnopozov ........ G06F 11/3476 |
| 2021/0382813 A1* | 12/2021 | Moondhra .......... G06F 11/3692 |
| 2022/0197777 A1* | 6/2022 | Souders ............. G06F 11/3628 |

OTHER PUBLICATIONS

Peiyi Han, SecureMLDebugger: A Privacy-Preserving Machine Learning, 2020, pp. 1-8. https://ieeexplore.ieee.org/stamp/stamp.jsp?tp=&arnumber=9172872 (Year: 2020).*

* cited by examiner

| Program Name | Component Name |
|---|---|
| Compontent1_Procedure1 | Component1 |
| Compontent1_Procedure2 | Component1 |
| Compontent2_Procedure1 | Component2 |
| Compontent3_Procedure1 | Component3 |
| Compontent3_Procedure2 | Component3 |

MULTI-USER DEBUGGING WITH USER DATA ISOLATION

BACKGROUND

Embodiments described herein generally relate to processing systems, and more specifically, to multi-user debugging with user data isolation.

A complex computer software program can divide a logic function into several layers, one or more of which can be subdivided into different components. These components run at the same time to complete a specific function. In some cases, these components are developed by different companies. However, in other cases, they are developed by the same company but belong to different departments.

SUMMARY

Embodiments of the present invention are directed to multi-user debugging with user data isolation.

A non-limiting example computer-implemented method includes receiving a first request from a first developer to initiate a debug of the program and receiving a second request from a second developer to initiate the debug of the program. The method further includes, responsive to receiving the first request and the second request, initiating the debug of the program. The method further includes sending first source code for the program to the first developer, wherein the first source code is associated with the first developer. The method further includes sending second source code for the program to the second developer, wherein the second source code is associated with the second developer. The method further includes updating the program responsive to receiving a change to at least one of the first source code or the second source code.

The non-limiting example computer-implemented method provides for a multi-user debugging environment and also provides for data protection through isolation, which improves the program being debugged and the computing system(s) on which they run by providing developers access to only their respective portions of the code while allowing multi-user debugging. This protects the source code of the program being debugged. Even developers from different companies/entities can perform sequential debugging on one function to improve the efficiency of problem solving.

In addition to one or more of the features described herein, or as an alternative, further embodiments of the method may include that the first request comprises a first user debug certificate associated with the first developer. In addition to one or more of the features described herein, or as an alternative, further embodiments of the method may include determining, based on the first user debug certificate, whether the first developer is authorized to access the first source code for the program prior to sending the first source code for the program to the first developer. The user debug certificate enables authority control for developers to their respective portions of source code.

In addition to one or more of the features described herein, or as an alternative, further embodiments of the method may include that the second request comprises a second user debug certificate associated with the second developer. In addition to one or more of the features described herein, or as an alternative, further embodiments of the method may include determining, based on the second user debug certificate, whether the second developer is authorized to access the second source code for the program prior to sending the second source code for the program to the second developer. The user debug certificate enables authority control for developers to their respective portions of source code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for multi-user debugging with user data isolation.

A complex computer software program can divide a logic function into several layers, one or more of which can be subdivided into different components. These components run at the same time to complete a specific function. In some cases, these components are developed by different companies. However, in other cases, they are developed by the same company but belong to different departments. Due to the requirements of source code authority management, developers are often only allowed to access the program code for components of their own company/department.

When there is a problem in the program, it is useful to reproduce the problem to determine which component(s) caused the problem. But sometimes the problem can only be reproduced in a specific environment. Each of the components related to the function in question are needed to work together to determine the scope of the problem. However, if each component is debugged separately, not only is more time needed to reproduce the problem, but also some intermediate states between components are not easy to save, which increases the communication workload between components.

The above-described aspects of the invention address the shortcomings of the prior art by providing a multi-user debugging environment between components by using a debug manager module. The multi-user debugging environment described herein provides for developers with different components to debug a function sequentially while also providing for local visibility of code between components based on authority control. The multi-user debugging environment improves the efficiency of communication between developers, saves communication time, and meets code authority control. The multi-user debugging environment also provides for data protection through isolation, which improves the program being debugged and the computing system(s) on which they run by providing developers access to only their respective portions of the code while allowing multi-user debugging. This protects the source code of the program being debugged. Even developers from different companies/entities can perform sequential debugging on one function to improve the efficiency of problem solving.

Figure 1:
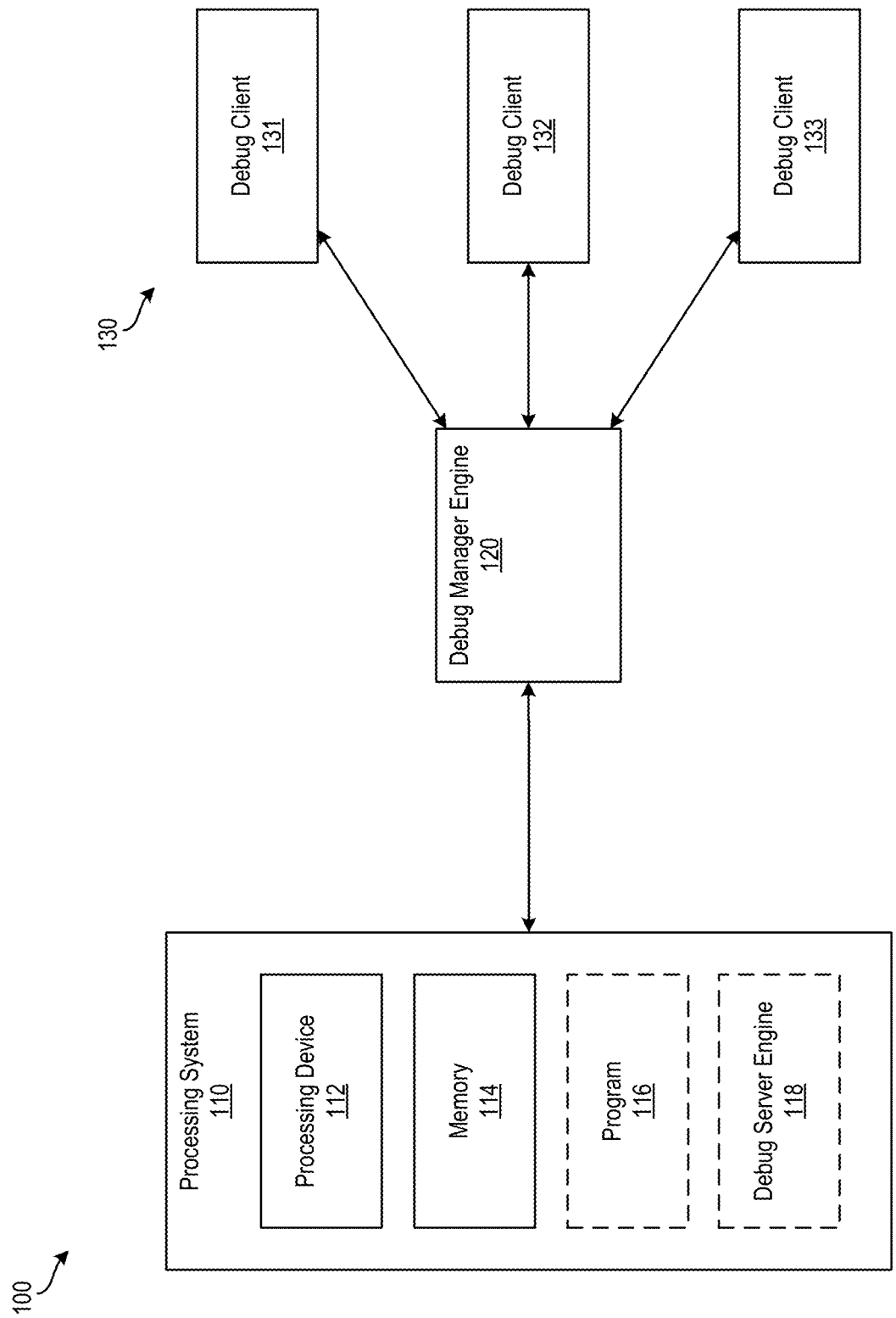
FIG. 1 depicts a block diagram of a system for multi-user debugging with user data isolation is depicted according to aspects of the present disclosure.

Turning now to FIG. 1, a block diagram of a system 100 for multi-user debugging with user data isolation is depicted according to aspects of the present disclosure. The system 100 includes a processing system 110, a debug manager engine 120, and debug clients 131, 132, 133 (collectively referred to as "debug clients 130). Although three debug clients 131-133 are shown, fewer or additional debug clients may be implemented in other embodiments, and the present techniques are not limited to the particular number of debug clients shown. The system 100 provides for sequentially debugging a complex program (e.g., a program 116) in one debug session between multi-user (e.g., the debug clients 130) with source code and runtime address authority control.

The processing system 110 includes a processing device 112 and a memory 114. The processing device 112 can be any suitable processing device(s), such as one or more of the processors 721 of the processing system 700 of FIG. 7, and the memory 114 can be any suitable memory, such as the RAM 724 or ROM 722 of the processing system 700 of FIG. 7. The memory 114 is an example of a computer readable storage medium and can store a program 116 as instructions (e.g., computer readable program instructions) that, when executed by the processing device 112, cause operations to be performed.

During software development of the program 116, it may be desirable to debug the program 116, such as when an error or "bug" occurs. Debugging is the act of finding and correcting defects or problems that occur during the execution of a program such as the program 116.

In the embodiment shown in FIG. 1, a debug manager engine 120 is provided that supports debugging. According to one or more embodiments described herein, the debug manager engine 120 provides for users/developers with access to (or ownership of) different components to debug a function sequentially using their respective debug clients 130 while providing local visibility of code between components based on authority control. According to one or more embodiments described herein, the debug manager engine 120 can communicate with the processing system 100 and the debug clients 130. The debug clients 130 can be any suitable device or system to enable a user to perform debugging, such as a laptop computer, desktop computer, mobile phone, tablet computer, and the like. The debug manager engine 120 provides for user data isolation, which is based on authority control, by providing a user debug certificate that provides for developers with proper authority to view and debug the source code of the program 116, check and change the content of a specific memory address, and the like.

In an example, the debug manager engine 120 can be incorporated into (or in conjunction with) the processing system 110 such that the processing system 110 (using the processing device 112 and the memory 114) cause the debug manager engine 120 to be implemented. In another example, the debug manager engine 120 can be implemented in a separate processing system (not shown) from the processing system 110.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 112 for executing those instructions. Thus a system memory (e.g., memory 114) can store program instructions that when executed by the processing device 112 implement the engines (e.g., the program 116, the debug manager engine 120, etc.) described herein. Other engines can also be utilized to include other features and functionality described in other examples herein.

Figures 2A, 2B:
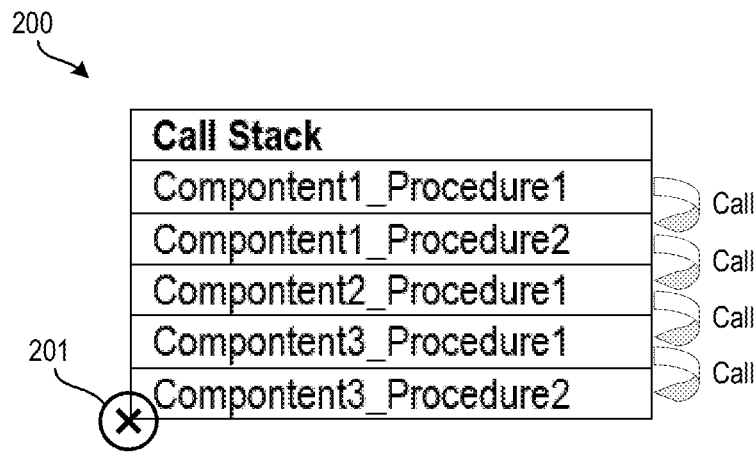
FIG. 2A depicts a table of a stack call that causes an error according to one or more embodiments described herein.
FIG. 2B depicts a table of program names and corresponding component names according to one or more embodiments described herein.
Figure 2C:
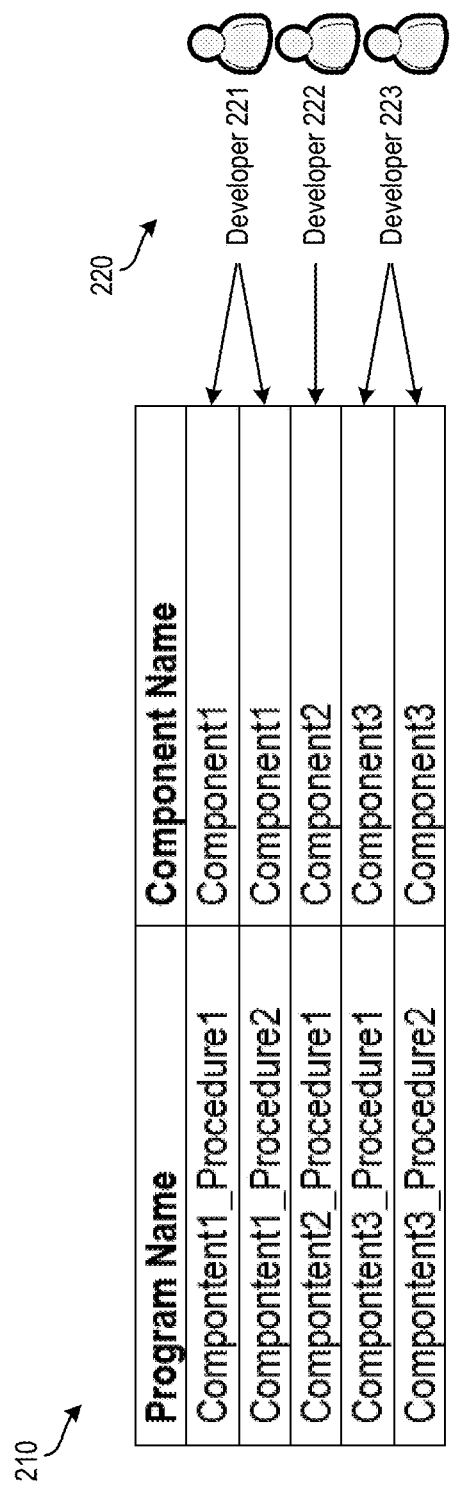
FIG. 2C depicts the table of program names and corresponding component names with each component's associated ownership/access according to one or more embodiments described herein.

FIGS. 2A-2C are now described, which relate to components of a program (e.g., the program 116) that are being debugged, according to one or more embodiments described herein. In the example of FIGS. 2A-2C, components Component1, Component2, and Component3 are running on the processing system 110 together to complete a specific function. However, when running, the program 116 encounters an error 201 issued from Component3_Procedure2. An example of the call stack 200 that caused the error 201 is depicted in the table of FIG. 2 according to one or more embodiments described herein.

Each row in the table represents information about the call stack 200 including what components and procedures have been called. For example, the call stack 200 begins with Component1_Procedure1 that calls Component1_Procedure2, which in turn calls Component2_Procedure1. Component2_procedure1 calls Component3_Procedure1, which in turn calls Component3_Procedure2. As can be seen, the components/procedures are interrelated by the respective calls.

FIG. 2B depicts a table 210 of program names and corresponding component names according to one or more embodiments described herein. In this example, Component1_Procedure1 and Component1_Procedure2 correspond to Component1, Component2_Procedure1 corresponds to Component2, and Component3_Procedure1 and Component3_Procedure2 correspond to Component3. Each component has a different authority for accessing its respective source code, as described with reference to FIG. 2C In particular, FIG. 2C depicts the table 210 of program names and corresponding component names with each component's associated ownership/access according to one or more embodiments described herein. That is, each of the components is accessible (or owned) by a developer of the developers 220. In this example, Component1 is accessible (or owned) by Developer 221, Component2 is accessible (or owned) by Developer 222, and Component3 is accessible (or owned) by Developer 223. Said another way, each of the developers 220 has the authority for the components as shown in FIG. 2C.

When debugging, it is useful to reproduce the problem to determine which component(s)/procedure(s) caused the problem. Each of the components related to a function in question (i.e., the function being debugged) are needed to work together to determine the scope of the problem. However, if each component is debugged separately, some intermediate states between components are not easy to save, which increases the communication workload between components. This is especially difficult where different developers are involved with different access to the components. For example, a first developer (e.g., one developer may only have access to the Component1, while a second developer only has access to Component2 and Component3).

Figure 3A:
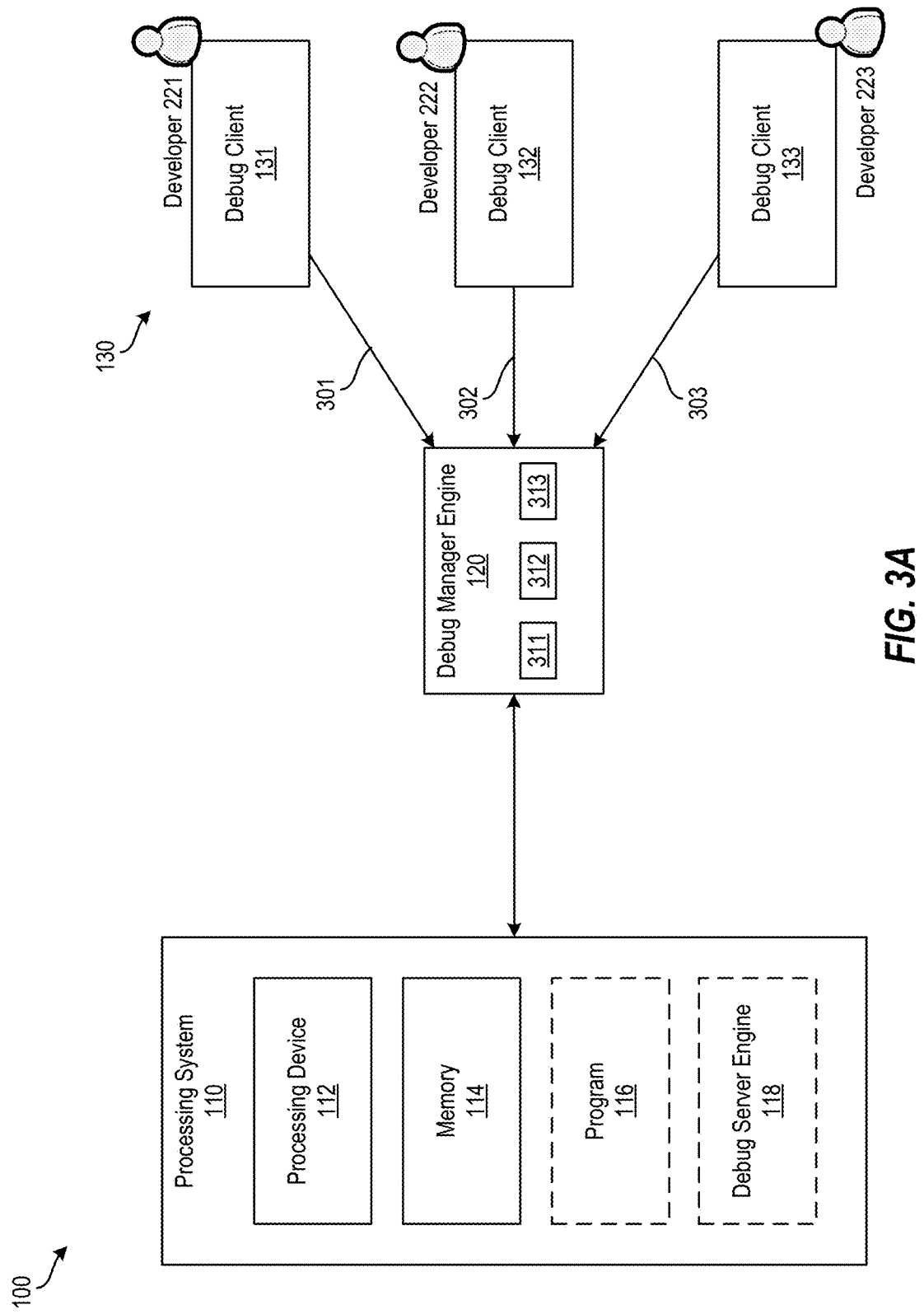
FIGS. 3A and 3B depict examples of the system of FIG. 1 according to one or more embodiments described herein.

To initiate a debug, one or more of the developers 220 send a debug request for their respective component(s) to the debug manager engine 120. This is shown in the example of FIG. 3A, where each of Developer 221, Developer 222, and Developer 223 sends a debug request 301, 302, 303, respectively, for their own component (as shown in FIG. 2B) to the debug manager engine 120 using their respective debug clients 131, 132, 133. Each request includes the developers user debug certificate. For example, Developer 221 has a user debug certificate 311, which is included in or with the debug request 301. Similarly, Developer 222 has a user debug certificate 312, which is included in or with the debug request 302, and Developer 223 has a user debug certificate 313, which is included in or with the debug request 303.

Figure 3B:
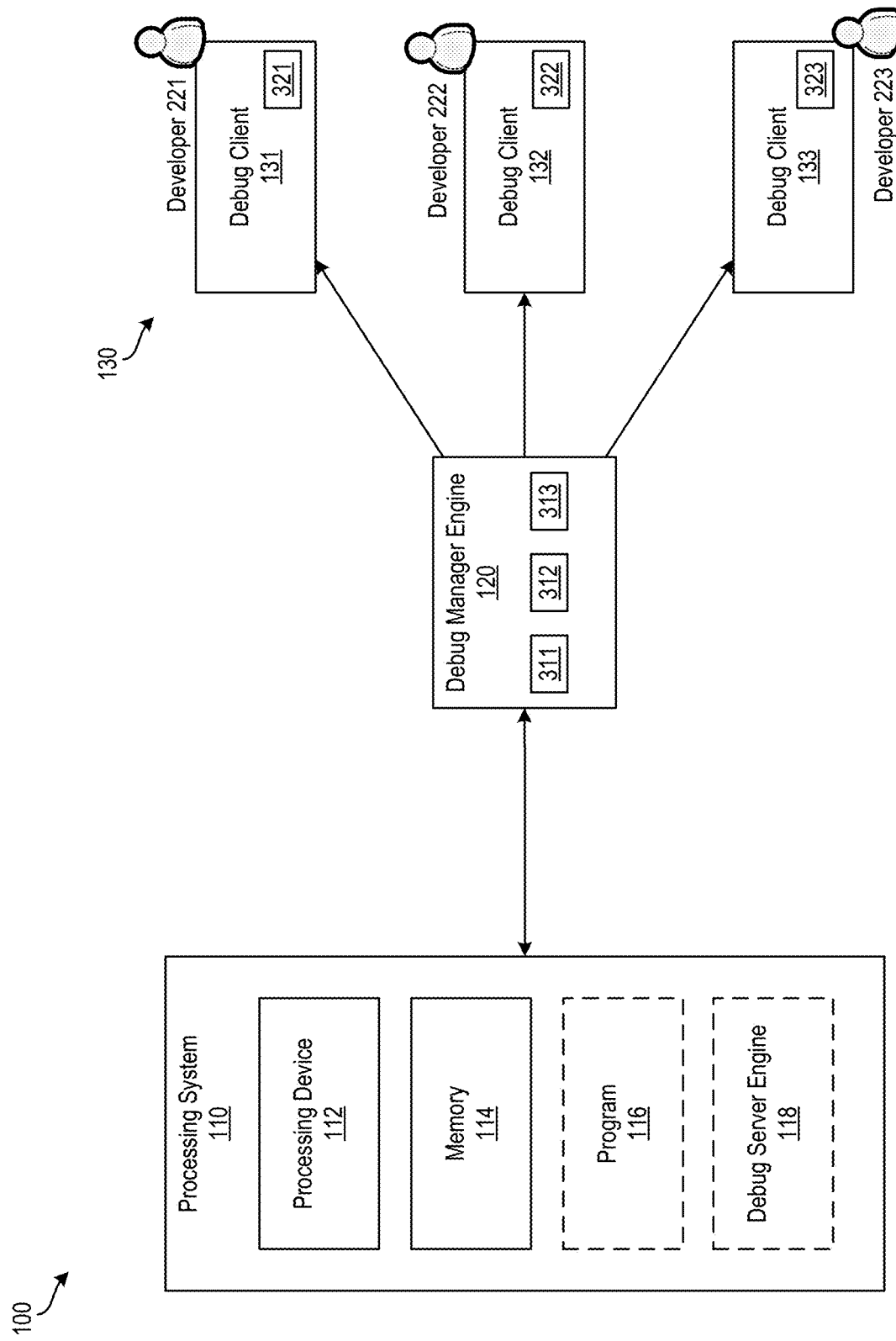

The debug manager engine 120 receives the debug requests 301, 302, 303 along with the user debug certificates 311, 312, 313 as shown. That is, each of Developer 221, Developer 222, and Developer 223 use their respective debug clients 130 to put their respective components (e.g., Component1, Component 2, Component3) of the program 116 into debug. When each of Developer 221, Developer 222, and Developer 223 begin the debug, the debug begins. The debug manager engine 120 sends the source code to each developer (e.g., Developer 221, Developer 222, and Developer 223) according to their respective debug requests 301, 302, 303 and their respective user debug certificates 311, 312, 313. Thus, Developer 221 sees the source code of Component 1 (i.e., the component of the program 116 associated with Developer 221), Developer 222 sees the source code of Component2 (i.e., the component of the program 116 associated with Developer 222), and Developer 223 sees the source code of Component 3 (i.e., the component of the program 116 associated with Developer 223). Each of the developers are then presented with debug interfaces, as shown in FIG. 3B, on a display of their respective debug clients 130. For example, Developer 221 is presented with a debug interface 321 for Component1, Developer 222 is presented with a debug interface 322 for Component2, and Developer 223 is presented with a debug interface 323 for Component3. One or more of the developers 220 can then revise their respective source code to update the program to correct a bug.

Figure 4:
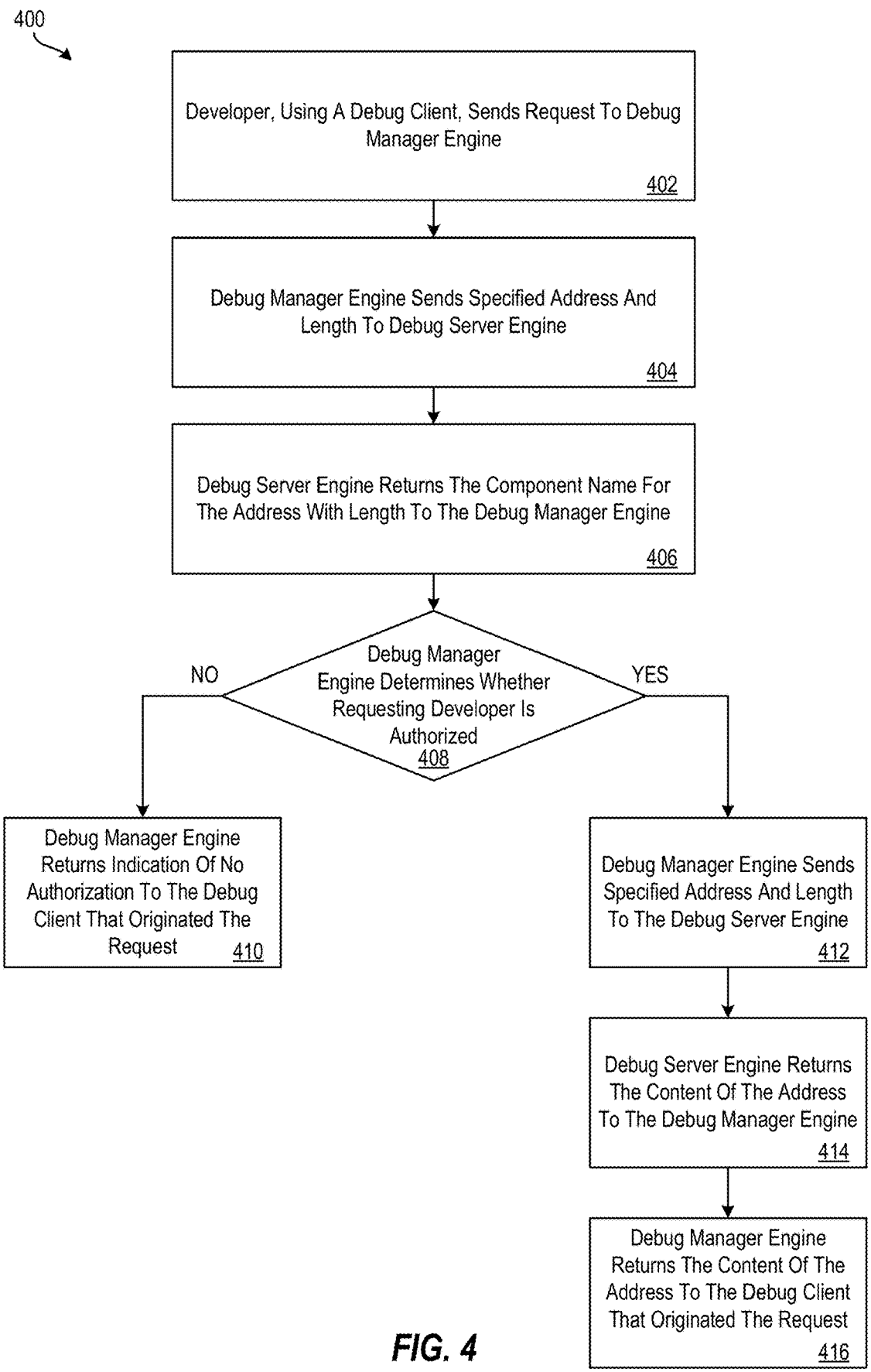
FIG. 4 depicts a flow diagram of a method for data isolation with source code control according to one or more embodiments described herein.

FIG. 4 depicts a flow diagram of a method 400 for data isolation with source code control according to one or more embodiments described herein. The method 400 is described with reference to the system 100 as shown in FIGS. 1, 3A, and 3B but is not so limited, and any suitable system, device, or combination thereof can be used to implement the method 400. For example, the method 400 can be performed by any suitable device(s) and/or system(s) such as: the processing system 110 and/or the debug manager engine 120 of FIGS. 1, 3A, and 3B; the processing system 700 of FIG. 7; and/or any other suitable device(s) and/or system(s). The method 400 is useful, for example, where different components (e.g., Component1, Component2, Component3) are in the same call stack (see, e.g., FIG. 2A) but have different address scopes.

At block 402 a developer (e.g., one of the developers 220) sends a request to the debug manager engine 120 to check the content of a specified address with length. For example, the developer 221, which is associated with the debug client 131, sends the request from the debug client 131 to the debug manager engine 120. It should be appreciated that multiple developers can send requests to the debug manager engine 120 simultaneously, concurrently, or at different times.

At block 404, the debug manager engine 120 sends the specified address and length to the debug server engine 118 to request the component name (e.g., Component1 in the case of Developer 221).

At block 406, the debug server engine 118 returns the component name for the address with length to the debug manager engine 120.

At block 408, the debug manager engine 120 checks whether the requesting developer (e.g., Developer 221) is authorized to access/modify the component (e.g., Component1). If not, at block 410, an indication (e.g., a message) of no authorization is returned to the debug client associated with the developer (e.g., the debug client 131 associated with Developer 221).

However, if the requesting developer is authorized as determined at block 408, the method 400 proceeds to block 412 where the specified address and length are sent back, by the debug manager engine 120, to the debug server engine 118 to request the content of the component (e.g., Component1).

At block 414, the debug server engine 118 returns the content of the address to the debug manager engine 120, and then, at block 416, the debug manager engine 120 returns the content of the address to the debug client 131 that originated the request (e.g., the debug client 131).

Additional processes also may be included, and it should be understood that the process depicted in FIG. 4 represents an illustration, and that other processes may be added or existing processes may be removed, modified, or rearranged without departing from the scope of the present disclosure.

With continued reference to FIG. 3B, system 100, using the debug manager engine 120, can implement one or more digital certificate manager (DCM) application programming interfaces (APIs). For example, one or more DCM APIs can be implemented in the debug manager engine 120 to automate the management of certificates without using a DCM browser-based interface. An application written using these DCM APIs can renew a certificate residing in a system certificate store, update an application definition to use the renewed certificate, and update a trust list with a certificate authority that issued the renewed certificate. The DCM APIs can enable, for example, X.509 certificates to be associated with a user profile, or any other suitable certificates for such purpose. The APIs can add, remove, list, and find certificates that are associated with user profiles (e.g. profiles of the developers 220).

The system 100, using one or more of the debug clients 130, can also implement user debug certificate modules that provide the following functions: calling DCM APIs to add, remove, and/or update a certificate assignment to the debug server engine 118, calling the DCM APIs to retrieve and verify the certificate assignment information for the debug server engine 118, etc.

A certificate (e.g., the user debug certificate 321-323) can contain information of a user profile for the respective developer, module/program/service program name, expiration date, etc. The debug manager engine 120 can verify the certificate before providing access to the source code and/or data logging, for example.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
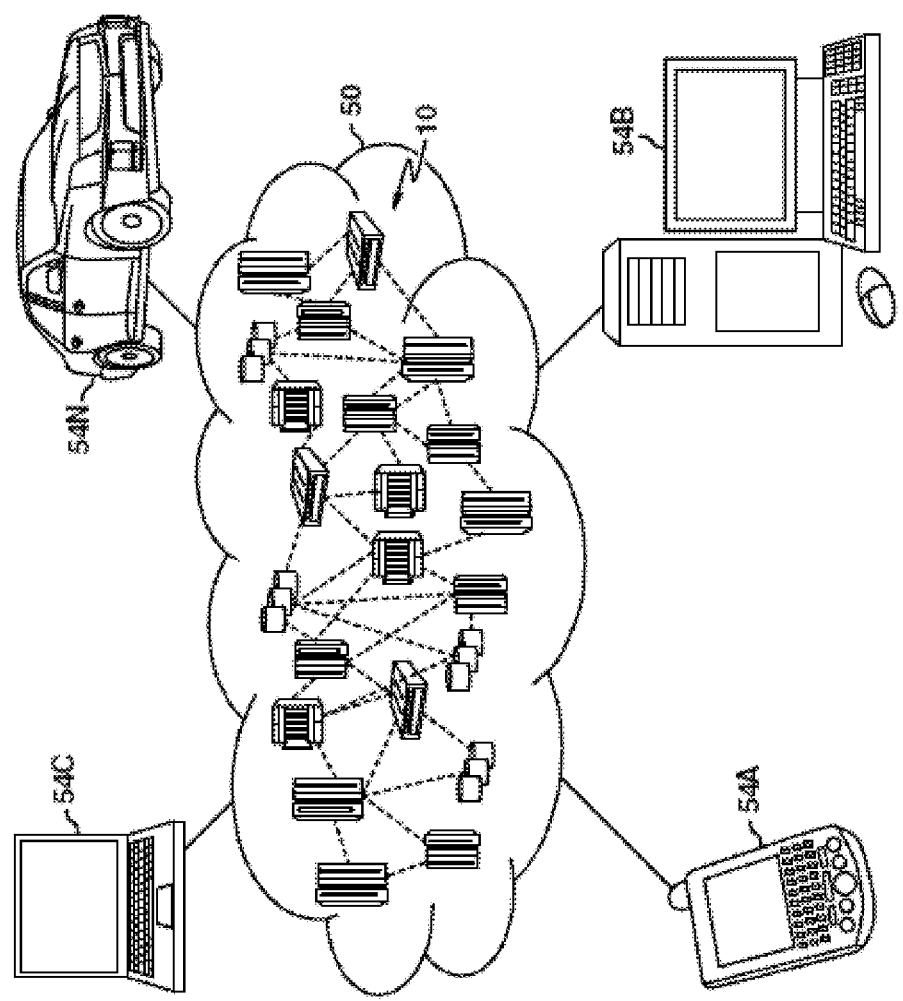
FIG. 5 depicts a cloud computing environment according to one or more embodiments described herein.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
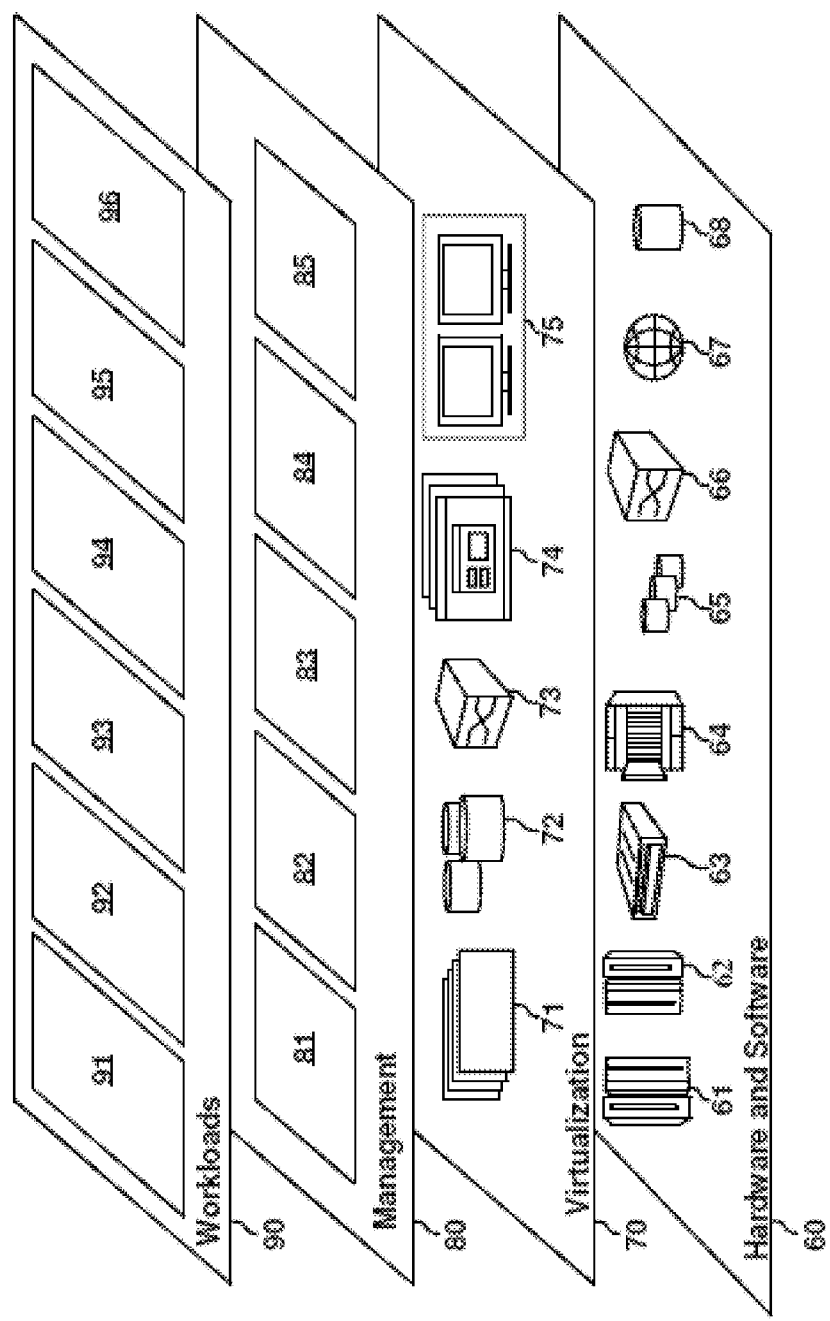
FIG. 6 depicts abstraction model layers according to one or more embodiments described herein.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debugging programs 96.

Figure 7:
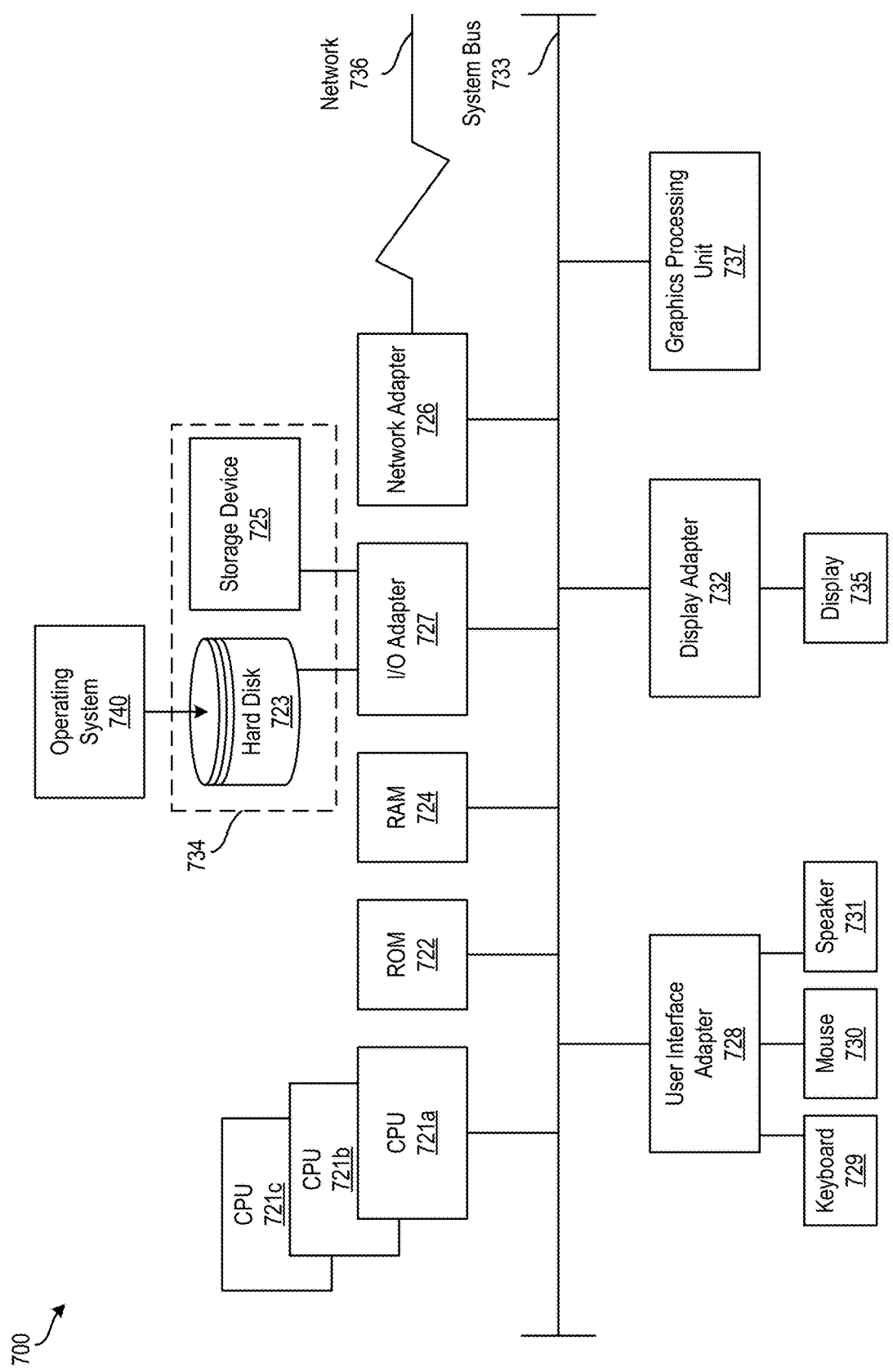
FIG. 7 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 7 depicts a block diagram of a processing system 700 for implementing the techniques described herein. In accordance with one or more embodiments described herein, the processing system 700 is an example of a cloud computing node 10 of FIG. 5. In examples, processing system 700 has one or more central processing units ("processors" or "processing resources") 721*a*, 721*b*, 721*c*, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 such as the AIX® operating system from IBM Corporation to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for multi-user debugging of a program, the method comprising:
   receiving a first request from a first developer to initiate a debug of the program;
   receiving a second request from a second developer to initiate the debug of the program;
   responsive to receiving the first request and the second request, initiating the debug of the program;
   sending a first source code for the program to the first developer, wherein the first source code is a first subset of a source code of the program that is associated with the first developer;
   sending a second source code for the program to the second developer, wherein the second source code is a second subset of the source code of the program that is associated with the second developer; and
   updating the program responsive to receiving a change to at least one of the first source code or the second source code,
   wherein the first source code is separate from the second source code, and
   wherein the first request comprises a first user debug certificate associated with the first developer and the second request comprises a second user debug certificate associated with the second developer, wherein the debug certificates enable authority control for developers to respective portions of the source code of the program,
   wherein the first and second subsets of the source code of the program are developed by different companies, the first and second subsets of the source code of the program are in a call stack but have different addresses, and the first and second subsets run together to complete a specific function, and
   wherein the call stack includes subsets of the source code that have been called and the first subset and the second subset are interrelated and wherein the multi-user debugging of the program provides isolated data protection.

2. The computer-implemented method of claim 1, further comprising:
   determining, based on the first user debug certificate, whether the first developer is authorized to access the first source code for the program prior to sending the first source code for the program to the first developer.

3. The computer-implemented method of claim 2, wherein the first source code is sent to the first developer responsive to determining that the first developer is authorized to access the first source code.

4. The computer-implemented method of claim 2, wherein the first source code is not sent to the first developer responsive to determining that the first developer is not authorized to access the first source code.

5. The computer-implemented method of claim 1, further comprising:
   determining, based on the second user debug certificate, whether the second developer is authorized to access the second source code for the program prior to sending the second source code for the program to the second developer.

6. The computer-implemented method of claim 5, wherein the second source code is sent to the second developer responsive to determining that the second developer is authorized to access the second source code.

7. The computer-implemented method of claim 5, wherein the second source code is not sent to the second developer responsive to determining that the second developer is not authorized to access the second source code.

8. A system comprising:
   a memory comprising computer readable instructions; and
   a hardware processor for executing the computer readable instructions, the computer readable instructions controlling the hardware processor to perform operations comprising:

receiving a first request from a first developer to initiate a debug of the program;

receiving a second request from a second developer to initiate the debug of the program;

responsive to receiving the first request and the second request, initiating the debug of the program;

sending a first source code for the program to the first developer, wherein the first source code is a first subset of a source code of the program that is associated with the first developer;

sending a second source code for the program to the second developer, wherein the second source code is a second subset of the source code of the program that is associated with the second developer; and updating the program responsive to receiving a change to at least one of the first source code or the second source code, wherein the first source code is separate from the second source code, and wherein the first request comprises a first user debug certificate associated with the first developer and the second request comprises a second user debug certificate associated with the second developer, wherein the debug certificates enable authority control for developers to respective portions of the source code of the program, wherein the first and second subsets of the source code of the program are developed by different companies, and the first and second subsets of the source code of the program are in a call stack but have different addresses, and the first and second subsets run together to complete a specific function, and wherein the call stack includes subsets of the source code that have been called and the first subset and the second subset are interrelated and wherein the multi-user debugging of the program provides isolated data protection.

9. The system of claim 8, further comprising:

determining, based on the first user debug certificate, whether the first developer is authorized to access the first source code for the program prior to sending the first source code for the program to the first developer.

10. The system of claim 9, wherein the first source code is sent to the first developer responsive to determining that the first developer is authorized to access the first source code.

11. The system of claim 9, wherein the first source code is not sent to the first developer responsive to determining that the first developer is not authorized to access the first source code.

12. The system of claim 8, further comprising:

determining, based on the second user debug certificate, whether the second developer is authorized to access the second source code for the program prior to sending the second source code for the program to the second developer.

13. The system of claim 12, wherein the second source code is sent to the second developer responsive to determining that the second developer is authorized to access the second source code.

14. The system of claim 12, wherein the second source code is not sent to the second developer responsive to determining that the second developer is not authorized to access the second source code.

15. A computer program product comprising a computer readable storage medium having program instructions embodied therewith, the program instructions executable by a processor to cause the processor to perform operations comprising:

receiving a first request from a first developer to initiate a debug of the program;

receiving a second request from a second developer to initiate the debug of the program;

responsive to receiving the first request and the second request, initiating the debug of the program;

sending a first source code for the program to the first developer, wherein the first source code is a first subset of a source code of the program that is associated with the first developer;

sending a second source code for the program to the second developer, wherein the second source code is a second subset of the source code of the program that is associated with the second developer; and updating the program responsive to receiving a change to at least one of the first source code or the second source code, wherein the first source code is separate from the second source code, and wherein the first request comprises a first user debug certificate associated with the first developer and the second request comprises a second user debug certificate associated with the second developer, wherein the debug certificates enable authority control for developers to respective portions of the source code of the program, wherein the first and second subsets of the source code of the program are developed by different companies, and the first and second subsets of the source code of the program are in a call stack but have different addresses, and the first and second subsets run together to complete a specific function, and wherein the call stack includes subsets of the source code that have been called and the first subset and the second subset are interrelated and wherein the multi-user debugging of the program provides isolated data protection.

* * * * *